7592½X
Beal & Bucklin,
Edging Timber.
Patented May 23, 1833.
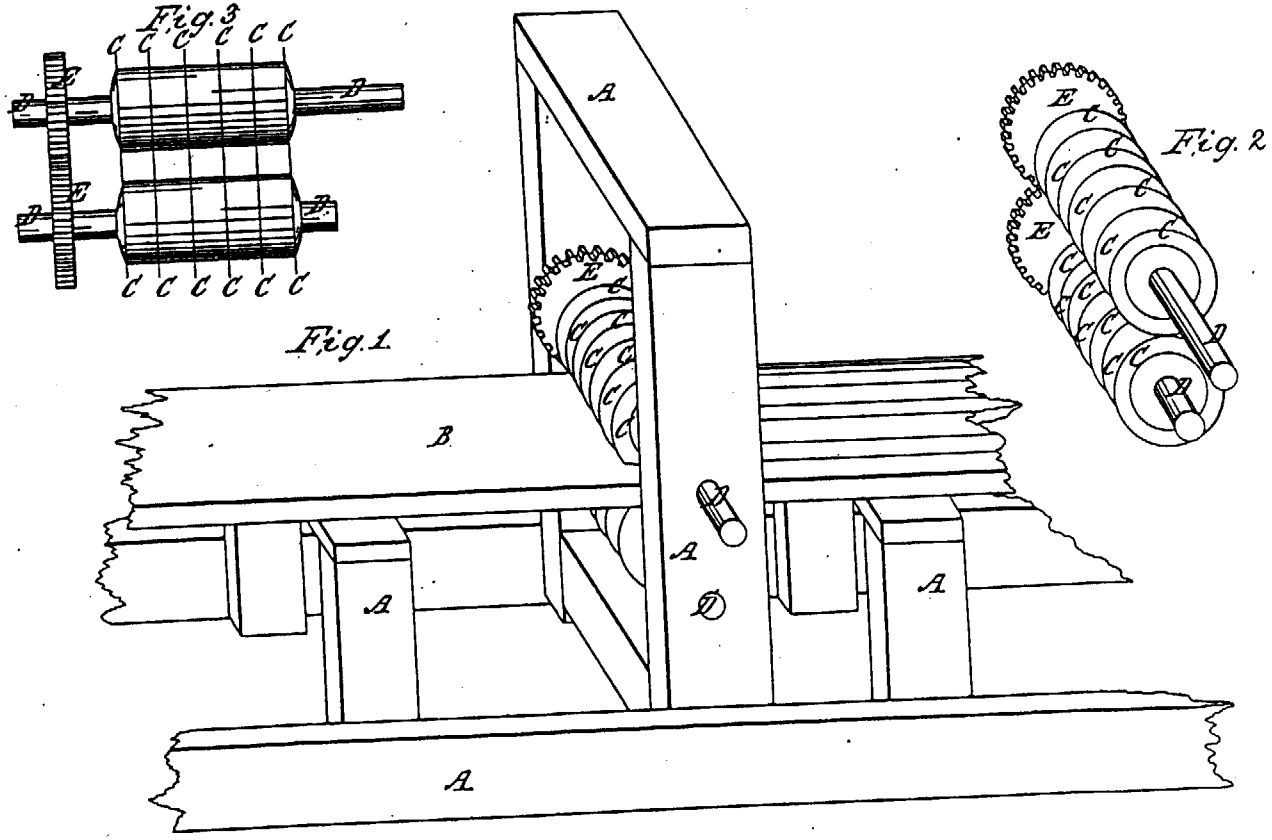
AM. PHOTO-LITHO. CO. N.Y. (SEGGERNE'S PROCESS.)

a. 14 75925X
May 23 1833 331.

Robert Beale and Moses Bucklin
Letters Patent

The Schedule referred to in these Letters Patent making part of the same containing a description in the words of the said Robert Beale and Moses Bucklin themselves of their improvement in the construction of a Machine for slitting timber viz laths & boards for various uses required in building houses, fences &c &c.

---

To all to whome these presents shall come. Be it known that I Robert Beale of Washington County District of Columbia & Moses Bucklin of the County of Grafton State of New Hampshire have invented a new and useful improvement in the construction of a machine for slitting timber viz laths boards, for various uses required in building houses fences &c &c and that the following is a full & exact description thereof viz circulars edges are prepared about 4 inches in diameter one or more pairs to every split which I wish to make running the board once through these edges are to be fixed on shafts which should be horizontal one above the other and the cutters are to be so fixed that the edges will one run true with the other that is the pairs one of each is to be fixed one on one shaft and one on the other shaft and the edges to come together as many as there be all should [illegible] and run edge to edge throughout and should be set such distance apart as the stuff is required to be split these shafts should be supported in certain frames or blocks and for splitting laths the stuff should first be sawed into plank about 1 1/4 inches thick then run through these cutters which are only the thickness of the lath apart and sufficient in number to slit the whole board in to laths once going through. The shafts to be geared one with the other and propelled by steam, water or any other power - it is preferable to have two sets of cutters one set running before the other. the first or forward cutters to set a little apart making an impression for those behind to follow and finish - in all cases there should be collars between the cutters and should fill between them as near down to the edges as the thickness

75921/2 X thickness of the plank with accuracy and in case there is a gang of saws for laths it is necessary to have bearings on the middle to support the shafts and keep them from springing. For slitting out stuff for doors, window frames, sashes and fences it may be done by having a crank on one of the shafts and turn it by hand. What we principally claim is the gearing one circular cutter over the other so as to prevent the plank from splitting & spalling at the bottom and the application to making laths.

Witnesses
Philip Peckham
John Peckham

Robert Beale
Moses Bucklin

Drawing

532 [illegible]